United States Patent Office 3,268,745
Patented August 23, 1966

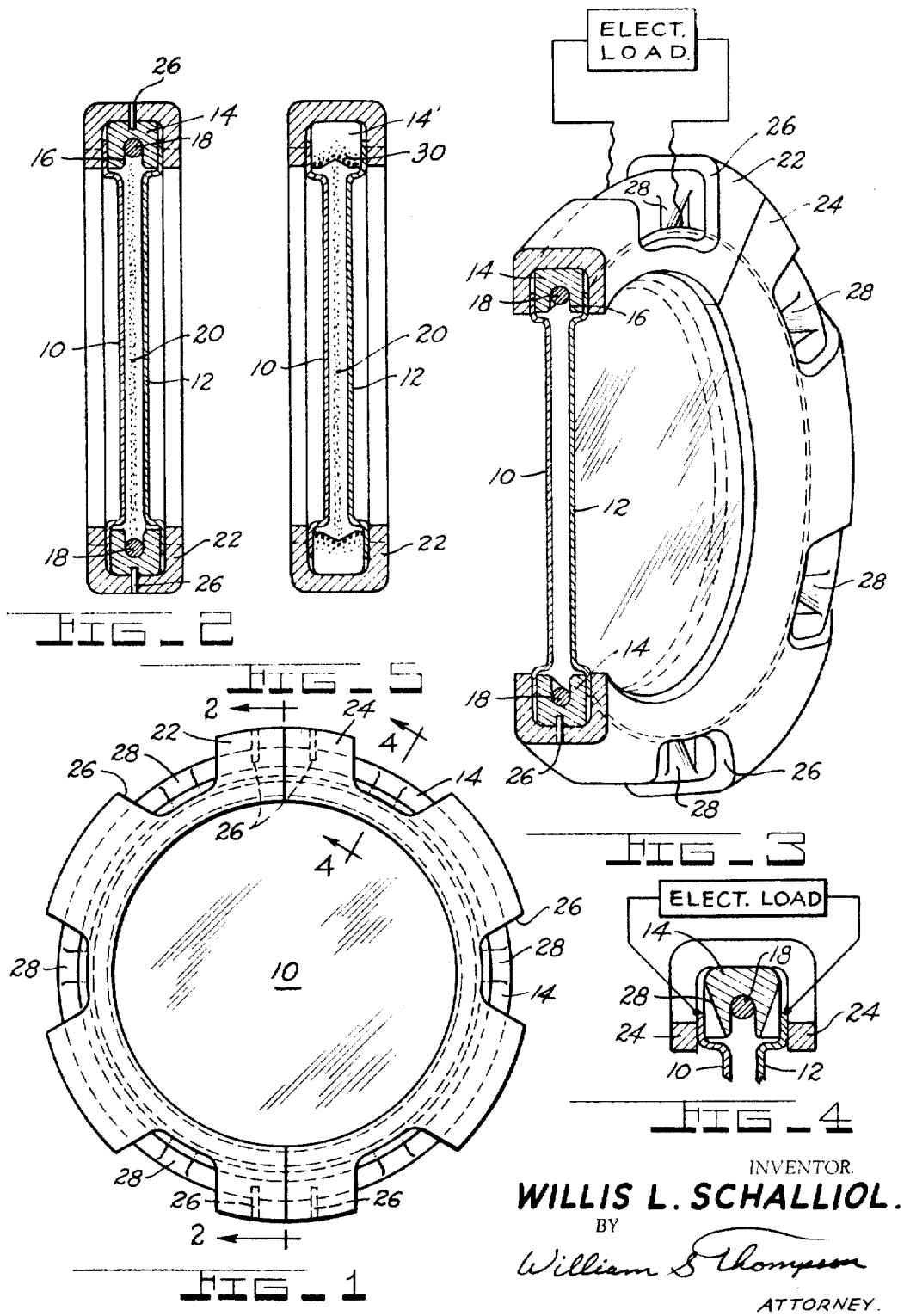

3,268,745
THERMIONIC CONVERTER VENTED TO THE ATMOSPHERE
Willis L. Schalliol, South Bend, Ind., assignor to The Bendix Corporation, South Bend, Ind., a corporation of Delaware
Filed June 13, 1963, Ser. No. 287,610
8 Claims. (Cl. 310—4)

The present invention relates to a thermionic converter especially adapted for use in space to convert solar energy to electrical energy.

In order to obtain acceptable efficiencies and power to weight ratios thermionic converters require means for reducing the negative space charge of electrons emitted by a heated cathode since this space charge has a repelling effect on the emission of further electrons required to establish a high level circuit flow.

One approach to this problem is to charge the interior of the converter with cesium vapor or similar acting vapor to neutralize the space charge. This arrangement requires that the converter unit be sealed to maintain the cesium vapor at an absolute pressure of approximately 1 to 2 mm. Hg. Should the seal be lost the cesium vapor will escape and for practical consideration the converter may be considered burned out or non-operative since the anode-cathode spacing is too great to permit electron flow in the absence of means to reduce the space charge. The probability of losing the converter seal within a relatively short life span in a space environment is high due to meteorite impact which can puncture the gastight capsule and thermal cycling in passing from dark areas in space to areas receiving solar radiation which causes unequal expansion and contraction of adjacent dissimilar materials inducing cracking or separation.

Sealing also has a detrimental effect on converter efficiencies. For best efficiencies cathode temperature should be in the range of 2700° R. to 3600° R. and most preferably in the high end of this range. To date because of low reliability under thermal cycling environments and poor temperature resistance of known seal types cathode temperatures have been limited in operational converters to less than 2000° R. causing a severe penalty in converter efficiency.

A second type of thermionic converter is the vacuum type which although it contains no ionized gas charge and does not require sealing, it has only about half the conversion efficiency of a cesium vapor converter. Further a vacuum converter requires extremely close anode to cathode spacing to reduce the negative space charge of the order or less than .001 inch making it difficult and costly to produce.

It is another object of the present invention to provide a thermionic converter for space having means continuously supplying positively charged particles to reduce or neutralize the negative space charge effect by means of radioactive decay.

It is an object of the present invention therefore to provide a thermionic converter having a relatively high conversion efficiency and relatively large anode to cathode spacing comparable to a cesium vapor converter which does not require a sealed or gastight enclosure.

Other objects and advantages of the present invention will become apparent with reference to the description and accompanying drawings wherein:

FIGURE 1 is a plan view of a preferred embodiment of my thermionic converter;

FIGURE 2 is a section view taken along section line 2—2 of FIGURE 1;

FIGURE 3 is an isometric view of the converter of FIGURES 1 and 2 with a segment removed;

FIGURE 4 is a partial section view taken along section line 4—4 of FIGURE 1; and FIGURE 5 is a cross section of a modified form of my thermionic converter.

Referring to the drawings, numeral 10 is a dish shaped cathode plate for receiving sun radiation which preferably has been intensified by a parabolic reflector, concentrating lens or the like. A similar shaped anode plate 12 is maintained parallel and concentric with the cathode at a spaced distance which is comparable to the spacing in a cesium vapor converter and many times greater than that of a vacuum converter which is normally about .001 inch or less. Although the spacing of cathode to anode is dependent on materials used and efficiencies sought and will vary between designs, for purpose of this disclosure the spacing may be considered as being greater than the practical limit of vacuum converters where the close spacing must be maintained to overcome the space charge effect. An illustrative spacing distance of certain known cesium vapor designs is .040 inch.

The anode-cathode spacing is maintained by a ceramic insulating ring 14 concentric and disposed between anode and cathode at the outer periphery. The ceramic insulating ring 14 has an annular slot 16 extending into the insulator ring from its inner diameter to define a generally U-shaped cross section. At the outer radial circumference of slot 16 a ring of radioactive material 18 is disposed which is operative to emit positively charged particles into the interelectrode space 20 for space charge neutralization. Preferably the radioactive ring 18 is recessed in slot 16 which provides a degree of emitted particle focusing in the direction of interelectrode space 20.

An important feature of my thermionic converter is the absence of metallized seals at the surface of contact between anode and cathode with the insulator ring 14. The anode and cathode plates are retained in position by a ceramic cage comprised of two semi-annular segments 22 and 24 having a generally U-shaped cross sectional area and which bracket the peripheral edges of anode and cathode maintaining them in position against ceramic insulator ring 14. Each annular cage segment is fitted over the assembly from opposite directions and then is fixed in assembled position by a series of cage retaining pins 26 which are driven through the retaining cage segment and into the insulator ring 14. The cage segments will permit the expansion and contraction of anode and cathode relative to insulator ring 14 due to thermal heat variations.

At intervals around the circumference of the retaining cage segments 22 and 24, a portion of the material is removed as illustrated by numeral 26 to expose the edges of anode and cathode. Ceramic insulator ring 14 is slotted as illustrated by numeral 28 to provide a leakage or vent path into the interelectrode space and to additionally provide a suitable location for wire circuit connection to anode and cathode.

MATERIALS

The radioactive ring 18 is to supply a continuous quantity of positively charged particles. It should preferably have a reasonably long half life to provide long term operation and emit only low energy gamma radiation, if any, to reduce personnel hazard in assembly and handling. Some naturally occurring radioactive materials which are positively charged alpha particle emitters are:

*Group I.—Naturally radioactive*

| | |
|---|---|
| Polonium | Uranium |
| Thorium | Samarium |

Additionally, certain artificially formed isotopes of other materials may be selected as follows either as single element materials or compounds:

*Group 2.—Artificially radioactive*

| Element: | Isotope |
|---|---|
| Hafnium | 170 |
| Lanthanum | 131 |
| Palladium | 101 |
| Molybdenum | 91 |
| Oxygen | 15 |
| Carbon | 11 |
| Nitrogen | 13 |
| Plutonium | 239 |
| Americium | 243 |
| Curium | 245 |
| Californium | 249 |

Many suitable cathode materials and combinations of materials have been evolved in the vacuum tube art. Generally for use as in a thermionic converter, best efficiency is obtained with cathode temperatures of from 2700° R. to 3600° R. A material having the ability to withstand high temperatures and produce a copious quantity of electrons is required. It should also have high heat absorptivity and be relatively impervious to bombardment by positive particles. With these considerations in mind, the preferred cathode materials are:

CATHODE MATERIALS

Tungsten    Molybdenum
Tantalum    Niobium

The anode should be a good heat radiating material as the conversion efficiency requires that it have as low a temperature as possible compared to the cathode. It is subjected to heat from electron bombardment and heat radiation from the cathode. Generally it is anticipated that means would be added to dispose of waste heat at the anode such as coolant pump systems, radiating fins or the like. The particular waste heat disposal means will be in a large measure dependent on system power rating and has not been illustrated as it is contemplated that any well known system may be used. The anode may be constructed of the same materials as the cathode, however, due to the lower temperature requirements additional materials may be added to this group:

ANODE MATERIALS

Tungsten    Titanium
Tantalum    Nickel
Molybdenum  Niobium

Insulator ring 14 and retaining cage segments 22 and 24 should be comprised of a ceramic or metal oxide nearly all of which are good electrical insulators. The ceramic should be selected to have a temperature resistance compatible with the environment bearing in mind it is in direct contact with the high temperature cathode. Suitable materials are:

CERAMIC MATERIALS (INSULATOR AND CAGE)

Hafnium Oxide      Aluminum Oxide
Thorium Oxide      Yttrium Oxide
Lanthanum Oxide

OPERATION

In operation, high intensity solar radiation is focused on the exterior surface of the cathode 10 imparting sufficient thermal agitation to permit electrons to leave the cathode. Some of these electrons will travel across the interelectrode space 20 to the anode 12 to establish circuit electron flow. Another portion of the electrons emitted from the cathode will have insufficient energy to travel to the anode and will form an electron cloud in the interelectrode space having a negatively charged potential. This negative space charge repels further electrons being emitted from the cathode. Portions or alpha particles from radioactive ring 18 are directed into the electron cloud neutralizing appreciably its negative charge.

The interelectrode space 20 is maintained at a high vacuum by means of vent passages 28 which permit communication with outer space environment which varies from $10^{-6}$ to $10^{-12}$ mm. Hg. Vent passage 28 additionally provides a path of escape for any decay products. For example, if sealed, the pressure within the converter would gradually increase by the combination of emitted alpha particles with two electrons to form helium gas. A pressure build-up is forestalled by providing a continuous leak path to space vacuum.

Referring to FIGURE 4 there is shown a second embodiment of my thermionic converter having a modified insulator ring 14 wherein there is dispersed through the ceramic insulator or radioactive ceramic 30 which emits positively charged particles into the interelectrode space thus performing the function of radioactive ring 18 of the FIGURES 1 through 3 arrangement. In order to maintain the electrical insulating properties, this arrangement will require an oxide of the metals listed as suitable for ring 18.

It will be observed that the anode and cathode are free to expand and contract with temperature cycling relative to the ceramic insulator without harmful effect and an indefinite number of cycles does not shorten the life of my converter as in the case of cesium vapor converters requiring a gastight enclosure. Since the cathode to anode electron flow is continuous as is the positive particle space neutralization charge, meteorite bombardment has relatively little effect even should it pierce the converter assembly.

Although two preferred forms of my thermionic converter have been shown and described, it is readily apparent the variations can be made without departing from the inventive concept defined in the claims. Particularly in the case of material selection, equivalent materials may be used from that disclosed which are intended to be illustrative and not restrictive. With particular respect to artificial radioactive emitting materials there are some 160 isotopes which are alpha particle emitters and as many, or more positron emitters. Cathode and anode materials have a long history of development and many suitable materials and combinations of materials have been used and their use is contemplated as direct substitutes for the materials enumerated herein.

I claim:

1. A thermionic converter for use in space vacuum comprising: an anode, a cathode, an electrical insulator having a central opening disposed between said anode and cathode to define an interelectrode space therebetween, retaining means for maintaining said anode and cathode in contactive engagement with said insulator while permitting relative thermal expansion between said anode and said insulator and said cathode and said insulator, means defining a vent path from said interelectrode space exteriorly to space vacuum, and positive charge particle emitting radioactive material retained adjacent said interelectrode space and operative to continuously emit positively charged particles therein.

2. A thermionic converter for use in space vacuum comprising: an anode, a cathode, an electrical insulator having a central opening disposed between said anode and cathode to define an interelectrode space therebetween, retaining means for maintaining said anode and cathode in contactive engagement with said insulator while permitting relative thermal expansion between said anode and said insulator and said cathode and said insulator, means defining a vent path from said interelectrode space exteriorly to space vacuum, said ceramic insulator including positive particle emitting radioactive material maintained around the periphery of said central opening for continuously emitting positively charged particles into said interelectrode space.

3. A thermionic converter for use in space vacuum comprising: a ceramic insulator of generally annular shape having a central opening formed therein, an anode plate abutting said ceramic insulator on one side thereof, a cathode plate abutting said ceramic insulator on the other side thereof to define an interelectrode space bounded by said anode and said catthode and peripherally by said ceramic insulator, said anode and cathode being free to expand relative to said ceramic insulator when heated, retaining means for retaining said anode and cathode in contactive engagement with said ceramic insulator while permitting thermal expansion thereof, said ceramic insulator having a recess formed around the periphery of said central opening, and a ring of positive particle emitting radioactive material maintained in said recess for emitting positively charged particles into said interelectrode space.

4. A thermionic converter for use in space vacuum comprising: a ceramic insulator ring having an imaginary center and an inner and outer diameter and forming a central opening, said insulator ring having a recessed slot extending radially into said ring from said inner diameter, a ring of radioactive material operative to emit positively charged particles disposed in said recessed slot of said insulator ring operative to focus said emitted particles toward the said imaginary center of said insulator ring, an anode plate abutting said ceramic insulator ring on one side thereof to enclose one side of said central opening, a cathode plate abutting said ceramic insulator ring on the other side thereof to enclose the other side of said central opening to define an interelectrode space bounded by said anode and said cathode and peripherally by said ceramic insulator, said anode and cathode being free to expand relative to said ceramic insulator ring when heated, retaining means for retaining said anode and cathode in contactive engagement with said ceramic insulator while permitting thermal expansion thereof.

5. A thermionic converter for use in space vacuum comprising: a ceramic insulator ring having an inner and an outer diameter; a cathode plate; an anode plate; said anode and cathode plates disposed in abutting relation on opposed sides of said ceramic insulator ring to form an interelectrode space bounded by said anode, cathode and ceramic insulator ring; said ceramic insulator ring containing particles of a dispersed radioactive positive particle emitting metal oxide adjacent said inner diameter for emitting positively charged particles into said interelectrode space; means for retaining said anode and cathode plates in abutting relation with said ceramic insulator ring while permitting relative thermal expansion and contraction.

6. A thermionic converter for use in a space vacuum comprising: a ceramic insulator ring having an inner and outer diameter; a cathode plate; an anode plate; said anode and cathode plates having peripheral edges placed in abutting relation on opposed sides of said ceramic insulator ring to form an interelectrode space; a ceramic retaining cage for clamping said anode and said cathode plates in position against said insulator ring; and radioactive means disposed in said interelectrode space for continuously supplying positively charged particles to said interelectrode space.

7. A thermionic converter for use in a space vacuum comprising: a ceramic insulator ring having an inner and outer diameter; a cathode plate; an anode plate; said anode and cathode plates having peripheral edges placed in contact on opposed sides of said ceramic insulator ring to form an interelectrode space; a ceramic retaining cage having a U-shaped cross section fitted over said insulator ring and said peripheral anode and cathode edges for maintaining said anode and cathode in position while permitting unrestricted thermal expansion thereof, and radioactive means disposed in said interelectrode space for continuously supplying positively charge particles to said interelectrode space.

8. A thermionic converter for use in space vacuum comprising: a ceramic insulator ring having an imaginary center and an inner and outer diameter and forming a central opening, said insulator ring having a recessed slot extending radially into said ring from said inner diameter, a ring of radioactive material operative to emit positively charged particles disposed in said recessed slot of said insulator ring operative to focus said emitted particles toward the said imaginary center of said insulator ring, an anode plate abutting said ceramic insulator ring on one side thereof to enclose one side of said central opening, a cathode plate abutting said ceramic insulator ring on the other side thereof to enclose the other side of said central opening to define an interelectrode space bounded by said anode and said cathode and peripherally by said ceramic insulator, retaining means for retaining said anode and cathode in contactive engagement with said ceramic insulator.

No references cited.

MILTON O. HIRSHFIELD, *Primary Examiner.*

J. W. GIBBS, *Assistant Examiner.*